(12) United States Patent
Günther

(10) Patent No.: US 11,975,487 B2
(45) Date of Patent: May 7, 2024

(54) METHOD AND DEVICE FOR PRODUCING 3D SHAPED PARTS USING CONSTRUCTION FIELD TOOLS

(71) Applicant: Voxeljet AG, Friedberg (DE)

(72) Inventor: Daniel Günther, Munich (DE)

(73) Assignee: VOXELJET AG, Friedberg (DE)

( * ) Notice: Subject to any disclaimer, the term of this patent is extended or adjusted under 35 U.S.C. 154(b) by 0 days.

(21) Appl. No.: 16/082,436

(22) PCT Filed: Mar. 8, 2017

(86) PCT No.: PCT/DE2017/000061
§ 371 (c)(1),
(2) Date: Sep. 5, 2018

(87) PCT Pub. No.: WO2017/152897
PCT Pub. Date: Sep. 14, 2017

(65) Prior Publication Data
US 2019/0084229 A1  Mar. 21, 2019

(30) Foreign Application Priority Data

Mar. 9, 2016  (DE) ..................... 10 2016 002 777.0

(51) Int. Cl.
| | | |
|---|---|---|
| *B29C 64/245* | (2017.01) | |
| *B29C 64/165* | (2017.01) | |
| *B29C 64/182* | (2017.01) | |
| *B29C 64/209* | (2017.01) | |
| *B29C 64/227* | (2017.01) | |

(Continued)

(52) U.S. Cl.
CPC .......... *B29C 64/245* (2017.08); *B29C 64/165* (2017.08); *B29C 64/182* (2017.08); *B29C 64/209* (2017.08); *B29C 64/227* (2017.08); *B33Y 10/00* (2014.12); *B33Y 30/00* (2014.12);

(Continued)

(58) Field of Classification Search
CPC ... B29C 64/227; B29C 64/245; B29C 64/165; B29C 64/182; B29C 64/209; B33Y 10/00; B33Y 30/00; B33Y 40/00; B33Y 40/20; B33Y 80/00
See application file for complete search history.

(56) References Cited

U.S. PATENT DOCUMENTS

| | | | |
|---|---|---|---|
| 3,668,997 A | 6/1972 | Ratowsky | |
| 3,913,503 A | 10/1975 | Becker | |

(Continued)

FOREIGN PATENT DOCUMENTS

| | | |
|---|---|---|
| AU | 720255 B2 | 5/2000 |
| CN | 101146666 A | 3/2008 |

(Continued)

OTHER PUBLICATIONS

US 4,937,420 A, 06/1990, Deckard (withdrawn)

(Continued)

*Primary Examiner* — Francisco W Tschen
*Assistant Examiner* — Elisa H Vera
(74) *Attorney, Agent, or Firm* — The Dobrusin Law Firm, P.C.

(57) ABSTRACT

The invention relates to a method and a device for producing 3D shaped parts (300), comprising a plurality of construction field tools (500), which are arranged in a movable manner, and at least one layer unit (800) which is arranged in a movable manner.

27 Claims, 10 Drawing Sheets

(51) Int. Cl.
  *B33Y 10/00* (2015.01)
  *B33Y 30/00* (2015.01)
  *B33Y 40/00* (2020.01)
  *B33Y 40/20* (2020.01)
  *B33Y 80/00* (2015.01)

(52) U.S. Cl.
  CPC .............. *B33Y 40/00* (2014.12); *B33Y 40/20* (2020.01); *B33Y 80/00* (2014.12)

(56) References Cited

U.S. PATENT DOCUMENTS

| | | |
|---|---|---|
| 4,247,508 A | 1/1981 | Housholder |
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,759,887 A * | 7/1988 | Geissler .............. C01B 33/02 264/237 |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,269,982 A | 12/1993 | Brotz |
| 5,284,695 A | 2/1994 | Barlow et al. |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,824,250 A | 10/1998 | Whalen |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 6,048,188 A | 4/2000 | Hull et al. |
| 6,048,954 A | 4/2000 | Barlow et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,335,097 B1 | 1/2002 | Otsuka et al. |
| 6,375,874 B1 | 4/2002 | Russell et al. |
| 6,403,002 B1 | 6/2002 | Van Der Geest |
| 6,405,095 B1 | 6/2002 | Jang et al. |
| 6,423,255 B1 | 7/2002 | Hoechsmann et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 | 5/2005 | Kubo et al. |
| 7,120,512 B2 | 10/2006 | Kramer et al. |
| 7,153,463 B2 | 12/2006 | Leuterer et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,455,805 B2 | 11/2008 | Oriakhi et al. |
| 7,497,977 B2 | 3/2009 | Nielsen et al. |
| 7,597,835 B2 | 10/2009 | Marsac |
| 7,641,461 B2 | 1/2010 | Khoshnevis |
| 7,790,096 B2 | 9/2010 | Merot et al. |
| 7,799,253 B2 | 9/2010 | Höschmann et al. |
| 7,939,003 B2 * | 5/2011 | Bonassar ............... B33Y 30/00 264/308 |
| 8,186,415 B2 | 5/2012 | Marutani et al. |
| 8,574,485 B2 | 11/2013 | Kramer |
| 8,951,033 B2 | 2/2015 | Höchsmann et al. |
| 9,327,450 B2 | 5/2016 | Hein et al. |
| 2001/0045678 A1 * | 11/2001 | Kubo ..................... B29C 64/35 264/37.29 |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |

(56) References Cited

U.S. PATENT DOCUMENTS

| | | |
|---|---|---|
| 2002/0167100 A1 | 11/2002 | Moszner et al. |
| 2003/0004599 A1 | 1/2003 | Herbak |
| 2003/0083771 A1 | 5/2003 | Schmidt |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0094058 A1 | 5/2004 | Kasperchik et al. |
| 2004/0112523 A1 | 6/2004 | Crom |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0276976 A1 | 12/2005 | Pfeifer et al. |
| 2005/0280185 A1 | 12/2005 | Russell et al. |
| 2006/0012058 A1 | 1/2006 | Hasei |
| 2006/0103054 A1 | 5/2006 | Pfeifer et al. |
| 2006/0105102 A1 | 5/2006 | Hochsmann et al. |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0003390 A1 | 1/2008 | Hayashi |
| 2008/0018018 A1 | 1/2008 | Nielsen et al. |
| 2008/0047628 A1* | 2/2008 | Davidson ............... B33Y 40/20 347/50 |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0241404 A1* | 10/2008 | Allaman ............... B29C 64/165 427/333 |
| 2008/0260945 A1 | 10/2008 | Ederer et al. |
| 2008/0299321 A1 | 12/2008 | Ishihara |
| 2009/0068376 A1 | 3/2009 | Philippi et al. |
| 2010/0007048 A1 | 1/2010 | Schweininger |
| 2010/0007062 A1 | 1/2010 | Larsson et al. |
| 2010/0212584 A1 | 8/2010 | Ederer et al. |
| 2010/0207288 A1 | 9/2010 | Enrico |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kahani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2012/0046779 A1 | 2/2012 | Pax et al. |
| 2012/0097258 A1 | 4/2012 | Harmann et al. |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2014/0048980 A1 | 2/2014 | Crump et al. |
| 2014/0065194 A1 | 3/2014 | Yoo |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1* | 10/2014 | Hartmann ............ B29C 64/209 264/401 |
| 2015/0042018 A1 | 2/2015 | Gunther et al. |
| 2015/0110910 A1 | 4/2015 | Hartmann et al. |
| 2015/0183166 A1 | 7/2015 | Yoo et al. |
| 2015/0224718 A1 | 8/2015 | Ederer et al. |
| 2015/0258744 A1* | 9/2015 | Muller ................. B29C 64/165 264/37.29 |
| 2015/0266238 A1 | 9/2015 | Ederer et al. |
| 2015/0273572 A1 | 10/2015 | Ederer et al. |
| 2015/0290878 A1 | 10/2015 | Houben et al. |
| 2015/0290881 A1 | 10/2015 | Ederer et al. |
| 2015/0375419 A1 | 12/2015 | Gunther et al. |
| 2016/0318251 A1 | 3/2016 | Ederer et al. |
| 2016/0107387 A1* | 4/2016 | Ooba .................... B29C 64/165 425/130 |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0050378 A1 | 2/2017 | Ederer |
| 2017/0050386 A1* | 2/2017 | Houben ................. B29C 64/35 |
| 2017/0106595 A1 | 4/2017 | Gunther et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0334140 A1* | 11/2017 | Andersson ............ B33Y 40/00 |
| 2017/0341302 A1* | 11/2017 | Höchsmann ......... B29C 64/255 |
| 2017/0355137 A1 | 12/2017 | Ederer et al. |
| 2018/0079133 A1 | 3/2018 | Ederer et al. |
| 2018/0079137 A1* | 3/2018 | Herzog ................. B29C 70/66 |
| 2018/0141271 A1 | 5/2018 | Gunter et al. |
| 2018/0326662 A1 | 11/2018 | Gunther et al. |
| 2018/0369910 A1 | 12/2018 | Gunter et al. |
| 2019/0047218 A1 | 2/2019 | Ederer et al. |
| 2019/0084229 A1 | 3/2019 | Gunther |

FOREIGN PATENT DOCUMENTS

| | | |
|---|---|---|
| CN | 104640686 A | 5/2015 |
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 A1 | 2/1995 |
| DE | 29506204 U1 | 6/1995 |
| DE | 4440397 | 9/1995 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 102006040305 A1 | 3/2007 |
| DE | 102006029298 A1 | 12/2007 |
| DE | 102007040755 A1 | 3/2009 |
| DE | 102007047326 A1 | 4/2009 |

(56) References Cited

FOREIGN PATENT DOCUMENTS

| | | | |
|---|---|---|---|
| DE | 102011053205 A1 | 3/2013 | |
| DE | 102013018031 A1 * | 6/2015 | ............. B22F 10/10 |
| EP | 0361847 B1 | 4/1990 | |
| EP | 1415792 | 5/2004 | |
| EP | 1457590 A | 9/2004 | |
| GB | 2297516 A | 8/1996 | |
| JP | S62275734 A | 11/1987 | |
| JP | 2003/136605 A | 5/2003 | |
| JP | 2004/082206 A | 3/2004 | |
| JP | 2009/202451 A | 9/2009 | |
| WO | 90/03893 A1 | 4/1990 | |
| WO | 01/40866 A2 | 6/2001 | |
| WO | 2004/014637 A1 | 2/2004 | |
| WO | 2006/100166 A1 | 9/2006 | |
| WO | 2008/049384 A1 | 5/2008 | |
| WO | 2008/061520 A2 | 5/2008 | |
| WO | 2011/063786 A1 | 6/2011 | |
| WO | 2013/075696 A1 | 5/2013 | |
| WO | 2014/039378 A1 | 3/2014 | |
| WO | 2014/090207 A1 | 6/2014 | |
| WO | 2014/166469 A1 | 10/2014 | |
| WO | 2015/056230 A1 | 4/2015 | |
| WO | 2015/163765 A1 | 10/2015 | |
| WO | 2015/167335 A1 | 11/2015 | |
| WO | 2016/019942 A1 | 2/2016 | |
| WO | 2017/008777 A1 | 1/2017 | |

OTHER PUBLICATIONS

English Translation of DE-102013018031-A1 retrieved from Espacenet on Nov. 29, 2022 (Year: 2022).*

International Search Report and Written Opinion, PCT Application No. PCT/DE2017/000061, dated May 31, 2007.

Marcus et al., Solid Freedom Fabrication Proceedings, Nov. 1993.

Cima et al., "Computer-derived Microstructures by 3D Printing: Bio- and Structural Materials," SFF Symposium, Austin, TX, 1994.

Marcus, et al., Solid Freeform Fabrication Proceedings, Sep. 1995, pp. 130-133.

Feature Article—Rapid Tooling—Cast Resin and Sprayed Metal Tooling by Joel Segal, Apr. 2000.

Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.

Sachs et al., "Three-Dimensional Printing: Rapid Tooling and Prototypes Directly from a CAD Model", Massachusetts Institute of Technology, Jan. 1990, pp. 143-151.

Williams, "Feasibility Study of Investment Casting Pattern Design by Means of Three Dimensional Printing", Department of Mechanical Engineering, abstract only; Sep. 25, 2001.

Screen shots of URL: http://www.youtube.com/watch?v=hgIrNXZjIxU taken in approximately 5 second intervals on Nov. 12, 2015.

Jacobs et al., 2005 SME Technical Paper, title "Are QuickCast Patterns Suitable for Limited Production?".

First Chinese Office Action, Application No. 201780016148.6 dated Nov. 25, 2019.

Second Chinese Office Action, Application No. 201780016148.6 dated Aug. 10, 2020.

Third Chinese Office Action, Application No. 201780016148.6 dated Feb. 26, 2021.

* cited by examiner

METHOD AND DEVICE FOR PRODUCING 3D SHAPED PARTS USING CONSTRUCTION FIELD TOOLS

CLAIM OF PRIORITY

This application is a national phase filing under 35 USC § 371 from PCT Patent Application PCT/DE2017/000061 filed on Mar. 8, 2017 and claims priority therefrom. This application further claims priority from German Patent Application DE 10 2016 002 777.09 filed on Mar. 9, 2016. PCT Patent Application PCT/DE2017/000061 and German Patent Application DE 2016 002 777.09 are each incorporated herein by reference in its entirety.

FIELD

A method and a device for manufacturing 3D molded parts using at least one construction field tool and at least one layering unit, also suitable for mass production of 3D molded parts such as foundry cores and molds and other articles needed in large quantities.

BACKGROUND

European Patent EP 0 431 924 B1 describes a process for producing three-dimensional objects, based on computer data. In the process, a thin layer of particulate material is deposited on a platform and has a binder material selectively printed thereon by means of a print head. The particulate region with the binder printed thereon bonds and solidifies under the influence of the binder and, optionally, an additional hardener. Next, the platform is lowered by one layer thickness into a construction roll and provided with a new layer of particulate material, the latter also being printed on as described above. These steps are repeated until a certain desired height of the object is achieved. Thus, the printed and solidified regions form a three-dimensional object.

Upon completion, the object made of solidified particulate material is embedded in loose particulate material, from which it is subsequently freed. For this purpose, a suction device may be used, for example. This leaves the desired objects which then have to be freed from any powder adhering to them, e.g. by brushing them off manually or by sandblasting.

The parts are usually present in a construction container after printing. In most cases, said construction container constitutes a cuboid volume. The volume is charged with various geometries so as to make good use of the machine.

3D printing on the basis of pulverulent materials and introduction of liquid binders is the quickest method among the layer construction techniques.

This method allows the processing of different particulate materials, including—as a non-exhaustive example—natural biological raw materials, polymeric plastic materials, metals, ceramics and sands.

As the binding system, for example, a solid in the particulate material may be used. The solid is solubilized by a solvent discharged from the inkjet print head. After evaporation of the solvent, the particles adhere to one another in the desired places. The part can be removed from the remaining loose powder after a certain waiting period. This waiting period is generally long, because the solvent is released again only slowly from the dissolved material. In many cases, the parts will be weak after unpacking and may be plastically deformed. The evaporation of the solvent causes a certain adhesion to the part which has to be removed manually after unpacking. In addition, the solvent may attack the print head. Moreover, the dissolution process with renewed subsequent solidification causes shrinkage in the part and, consequently, geometric deviations.

A solvent may also be charged with molecules or particles and used to reduce shrinkage. The aggressiveness of the solvent may also be reduced while the strength of the part remains unchanged. However, the solvent must be completely removed before unpacking, and the problem of adhesions still exists here, too.

Another option is to use a system which leads to solidification of the imprinted liquid by chemical means, thus causing the particles to bond. In this case, the components of the system are stored separately in the system, if possible. The desired solidification reaction will not occur until the printing process. A method known as cold resin process may be cited as an example of such a system. It includes contacting an acid-coated sand with furfuryl alcohol. This results in a chemical reaction converting the previously liquid components into a cross-linked plastic material.

Some prior art printers have construction containers which can be removed from the system and are also referred to as job boxes or construction containers. The serve as boundaries for the powder, thereby stabilizing the construction process. Changing the construction container allows the process steps to be carried out in parallel, thus making efficient use of the system. There are also systems which involve printing on a platform which can be removed from the system, just like the construction containers. Methods are also known wherein a continuous conveyor belt is printed on at a certain angle.

In all methods, the parts are finally present in the powder and, using further technical measures, have to be fed to further automated processing. In this context, the construction container, its size and the multitude of producible shapes are factors limiting the integration of the layer construction process into a production system. There are, in fact, numerous ideas for automation via robots or manipulating devices. However, the powder cake, the removal of the particulate material and the exact position of the parts make reliable and efficient unpacking and transfer to further processing facilities technically difficult to control.

In prior art layer construction methods, it is assumed that parts as diverse as possible with different dimensions have to be produced. This concept is referred to as rapid prototyping. Assuming a specific, very limited parts spectrum, systematic methods for integration into a production plant can be implemented. This concept is referred to nowadays as additive manufacturing. Usually, identical or different parts are arranged in an optimized manner in a construction space or a job box and manufactured in a batch method or in continuous 3D printing methods. However, various disadvantages result with respect to mass production.

SUMMARY

Consequently, in one aspect, it is an object of the invention to reduce or entirely avoid the disadvantages of known prior art methods. In another aspect, it is an object of the invention to provide a method and suitable devices allowing to achieve the manufacture of 3D molded parts in large numbers, avoiding the disadvantages of known methods, or at least some of them.

This object is achieved by a production device which comprises construction field tools that are similar in volume to the object to be produced, said device using one or more layering units which are arranged on a traversing axis and can print on the construction field tools, and said device being able to move the construction field tools in a synchronized manner into or out of the printing device into further devices. In a sense, the invention is also a method which uses the devices provided by the production device.

In one aspect, the invention relates to a layer construction production system which is dimensioned for a specific production purpose, works in a synchronized manner, comprises device parts designed to receive products, has redundant, height-adjustable layering units and wherein subsequent process steps, such as curing the parts and automatically removing them, are integrated in the overall system.

The invention is a production device according to claim 1, which comprises construction field tools that are similar in volume to the object to be produced, said device using one or more layering units which are arranged on a traversing axis and can print on the construction field tools, and said device being able to move the construction field tools in a synchronized manner into or out of the printing device into further devices.

In particular, the object is achieved by a device for manufacturing 3D molded parts, comprising: one or more construction field tools, arranged in a movable manner, and at least one layering unit, also arranged in a movable manner.

It has been shown that the device according to the invention and the method which can be carried out with it make it possible to simplify the 3D printing method, make it accessible to automated process steps and allow series production to be carried out in a mostly automated or robot-based manner.

In known 3D printing methods, the parts to be produced are arranged in the construction space or on the construction platform, respectively, in an optimized manner, according to their shape, and are produced in an overlying arrangement. Moreover, it is a matter of a relatively large volume, which is difficult to handle and also has an insulating effect. Unpacking requires great care, and discharging any particulate material not solidified would result in the produced parts lying over each other without any order.

The device according to the invention and the method which can be carried out with it now advantageously allow unpacking to be automated. Simple discharging of the powder via a flap or in any other automated manner by automatic suction, blowing off or the like is now quite safe, because only one part is present per construction field tool. Thus, the use of the construction field tool makes it possible, advantageously, to save expensive and time-consuming manual work with respect to the unpacking operation.

Another advantage is that steps which become necessary after the construction of the 3D molded part, such as heat treatment, can now be carried out in an automated manner as well. In this context, it is advantageous that the part, after automated unpacking, can be transferred to a thermal treatment station by further conveying means, again without manual intervention. This makes the manufacturing process quicker, more economic and, on the whole, more efficient.

As far as heat treatment in the powder cake is advantageous, it has not been possible to put into practice in the prior art in such a manner that the powder cake has an insulating effect and, thus, too much time would be needed in many cases to heat the entire volume of the powder cake to the desired temperature. Now, the device according to the invention and the method which can be carried out with it allow a heat treatment to be performed on the construction field tool. It is only a relatively small volume which can be brought to the required temperature as a whole within an acceptable time frame, and therefore can be conducted directly in the powder cake.

In further embodiments, the invention relates to a device wherein the layering unit(s) is (are) movable in the direction of Z or/and X. Further, the construction field tool(s) may be movable in the direction of X or/and Y.

Advantageously, the plurality of construction field tools may be arranged in series and connected with each other. This allows a coordinated movement of the individual construction field tools and achieves series production of parts. In this case, there is a sort of assembly line and the construction field tools can be moved toward the layering units. After the construction of the molded part in a construction field tool or in parallel, i.e. in several construction field tools next to each other, in which case several layering units may then be applied, the construction tools are preferably moved in a synchronized manner, and molded parts are then printed again in subsequent construction tools. At the bottom of the process chain, further process steps or additional treatment steps may then be performed on the molded parts produced. All process steps may be interlinked in an automated manner. Preferably, robots are used.

In the device according to the invention, construction field tools and layering units may be controllable in a directed and coordinated manner. This serves to optimize the sequence of a series process or of a series production of parts in large numbers.

In the device according to the invention, the construction field tools are adapted to the part to be produced such that, around the part there is only room enough for a small area of unsolidified powder material and such that the construction field tools substantially have the dimensions of the 3D molded parts to be manufactured.

In order to couple or connect the construction field tools with each other, use can be made of any suitable means generally known to the person skilled in the art. Preferably, the construction field tools are connected to each other by one or more chains, toothed belts, racks, cable pull or cable pulls, hydraulic means, and are thereby movable or/and can thereby be moved in a synchronized manner.

The device according to the invention may be coupled with other devices which are useful for the production of the desired molded parts. Particularly advantageously, the device according to the invention is coupled with further means for further process steps after the construction of the 3D molded parts and/or comprises means which are suitable for automated removal of the 3D molded parts. The device may further be linked with further processes or process steps for the treatment of the molded parts, such as heat treatment steps or any other parts finishing steps via conveying means.

In another aspect, the invention relates to a method for manufacturing 3D molded parts, wherein 3D molded parts are produced using known means of 3D printing, characterized in that each 3D molded part is produced in a separate construction field tool and that the construction field tools can be moved in a coordinated manner.

All means and device means described above in connection with the device according to the invention may be correspondingly formulated in the same manner in process steps and be correspondingly applied herein.

DETAILED DESCRIPTION

Figure 1:
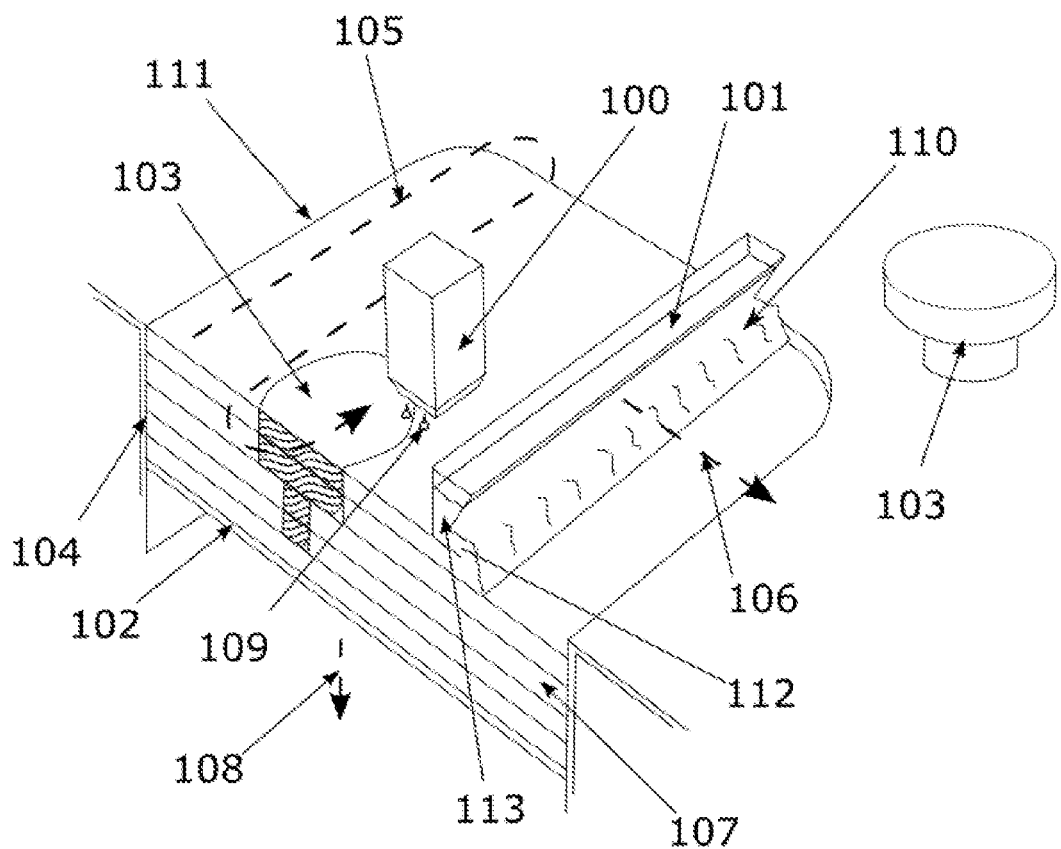
FIG. 1: View of a conventional 3D printing process according to the prior art. Oblique sectional view.

In the following, several terms will be defined more precisely. Otherwise, the terms used shall have the meanings known to the person skilled in the art.

In the sense of the invention, "layer construction methods" or "3D printing methods", respectively, are all methods known from the prior art which enable the construction of parts in three-dimensional molds and are compatible with the described process components and devices.

A "molded article" or "part" or 3D molded part or 3D part in the sense of the invention means all three-dimensional objects manufactured by means of the method according to the invention or/and the device according to the invention and exhibiting dimensional stability.

A "construction field" is the plane or, in a broader sense, the geometric location on or in which the particulate material bed grows during the construction process by repeated coating with particulate material. The construction field is frequently bounded by a bottom, i.e. the "construction platform", by walls and an open top surface, i.e. the construction plane.

A "construction field tool" in the sense of the invention refers to a means or a part of the device according to the invention using which the result of the operations of coating, printing and adjusting the working height can be achieved; it preferably also includes the operation of moving the powder cake, i.e. the particulate material which has not solidified, out of the tool after completion of the printing operation. The construction field tool may be equipped with an openable bottom and with different features for processing the parts in subsequent processes after printing. In this case, the construction field tool is embodied such that an edge or a grating at the bottom prevents the produced 3D part from falling out when opening the flap. In one embodiment, the construction field tool may consist of a base plate and laterally pulled up, rolled, bent or attached sides. In this case, the construction field tool then comprises, on the other two sides or on one side, either no side parts at all or only very low sides to allow easy removal of the 3D part from it. This achieves and facilitates removal or even unpacking in further processing, carried out automatically or/and by means of robots or feeding to further treatment processes or steps. An exemplary construction field tool is described by reference numeral 500.

The process of "printing" summarizes the operations of coating, imprinting and working height adjustment and, according to the invention, takes place in an open or closed process chamber.

A "receiving plane" in accordance with the present description means the plane onto which the construction material is applied. According to this invention, the receiving plane is located above the marks in the construction field tool. In accordance with the invention, the receiving plane is always freely accessible in one spatial direction by a linear movement.

A "traversing axis" in a device and method according to the invention is an axis which carries layering units or which can be produced along them, is arranged above the construction field tools and has a long travel compared to the other axes in the system. "Traversing axis" may also indicate the direction in which, for example, a construction field tool is synchronized and can be moved in coordination with other device parts. A print head can also be moved on a "traversing axis".

According to the invention, "spreading out" means any manner in which the particulate material is distributed. For example, a larger quantity of powder may be placed at the starting position of a coating pass and may be distributed or spread out into the layer volume by a blade or a rotating roller.

As the "particulate material" or "powder" all flowable materials known for 3D printing may be used, in particular in the form of a powder, slag or liquid. These may include, for example, sands, ceramic powders, glass powders and other powders of inorganic or organic materials, such as metal powders, plastic materials, wood particles, fiber materials, celluloses or/and lactose powders, as well as other types of organic, pulverulent materials. The particulate material is preferably a free-flowing powder when dry, but a cohesive, cut-resistant powder may also be used. This cohesiveness may also result from adding a binder material or an auxiliary material.

The "surplus quantity" or "overfeed" is the amount of particulate material which is pushed forward in front of the coater during the coating pass at the end of the construction field.

"Coater" or "recoater" means the unit by means of which the particulate material is applied into or onto the construction field. The unit may consist of a fluid reservoir and a fluid application unit wherein, according to the present invention, the fluid application unit comprises a fluid outlet and a "coating knife device". Said coating knife device may be a coating blade. However, any other conceivable, suitable coating knife device may be used. For example, rotating rollers are conceivable as well.

A "layering unit" in the sense of the invention is a combination of a print head, a coater and a vertical axis into a module. This module, if moved over the receiving plane by the traversing axis, can execute the operations of coating, imprinting and working height adjustment. Preferably, the "layering unit" comprises a print head arranged between two coating means. The "layering unit" is movable in the Z-axis and is preferably moved upward in the direction of the Z-axis, by one layer thickness in each case, during the printing process. In this case, the steps of coating and of applying the binder selectively behind the newly applied powder material by the print head are performed in virtually one single work process. In normal operation, the "layering unit" is movable in the direction of X during coating and printing.

The "layering unit" can preferably perform coating and selective printing of the binder in both directions, i.e. during both the feed and the return movement. Furthermore, mobility or movability may be provided in any other direction so as to compensate for potentially defective nozzles in the print head by direction adjustment in the function of the print head.

The "print head" usually consists of various components. These include the print modules which are aligned with respect to the print head. The print head is aligned with respect to the machine. This allows the position of a nozzle to be assigned to the machine coordinate system.

The "box volume" of a part is the volume of the smallest cuboid into which the part can be brought without the part penetrating an area of the cuboid.

"Finishing" means the cleaning of the part to remove any adhesions until the desired geometry is free from any adhesions and the part can be fed to another production step in a process chain.

A "binder jetting layer construction method" means that powder is applied in layers onto a construction platform, a liquid binder is printed on the cross-sections of the part on this powder layer, the position of the construction platform is changed by one layer thickness with respect to the previous position, and these steps are repeated until the part is finished.

"Synchronized" in the sense of the invention means that the layering unit or layering units builds up one part each in a construction field tool and then the construction field tools are moved on to the next work position, depending on their arrangement. Next, parts are built up by the layering unit or layering units in further construction field tools in another step. In accordance with the device, this is then repeated multiple times or may be performed "continuously" in series production or as a sort of assembly line.

Various aspects of the invention will be described below by way of example, without being construed as restrictive.

The system of the invention is closely modeled on powder-based 3D printing. The device according to the invention comprises entirely different functional relationships and will be described in more detail below.

FIG. 1 shows a 3D printer according to the prior art. The 3D printer comprises the following device parts: a print head (100), a coater (101) and a construction platform for feeding individual layers (107). The powder cake grows in a construction container (104) during the process. The result is a three-dimensional part (113), which can be unpacked from the loose powder surrounding the part.

The device according to the invention comprises a powder coater (101). Particulate material is applied onto a construction platform (102) and smoothed by the powder coater (101) (FIG. 2(a)). The particulate material applied may consist of diverse materials. For example, sands, ceramic powders, metal powders, plastic materials, wood particles, fiber materials, celluloses, lactose powders etc. may be used. The flow properties of these materials may differ considerably. Various coating techniques allow the forming of layers from dry, free-flowing powders to cohesive, cut-resistant powders or even liquid-based dispersions. The height of the powder layers (107) is determined by the construction platform (102). The construction platform (102) is lowered after application of one layer. In the next coating process, the resulting volume is filled and the excess is smoothed down. The result is an almost perfectly parallel and smooth layer of a defined height.

Figure 2:
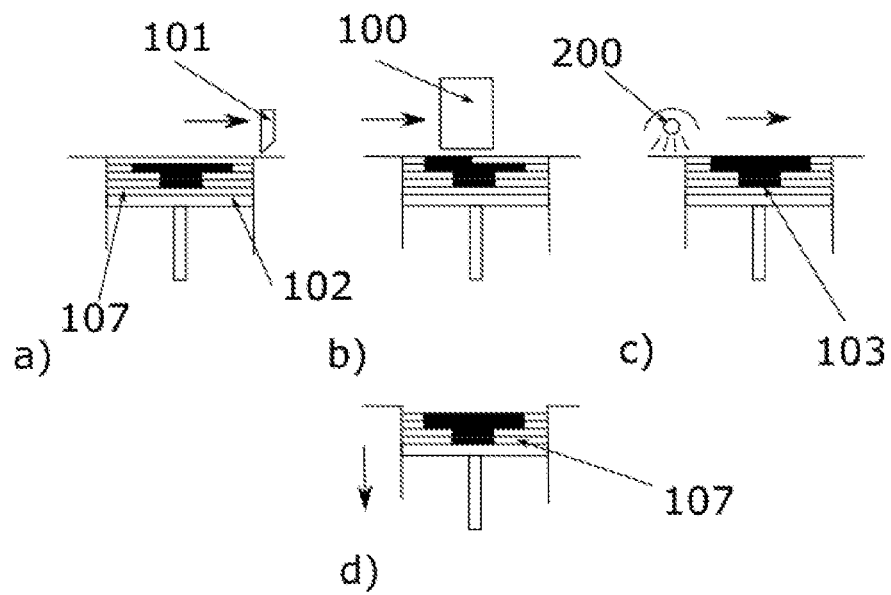
FIG. 2: Schematic view of the process steps of 3D printing.
Figure 3:
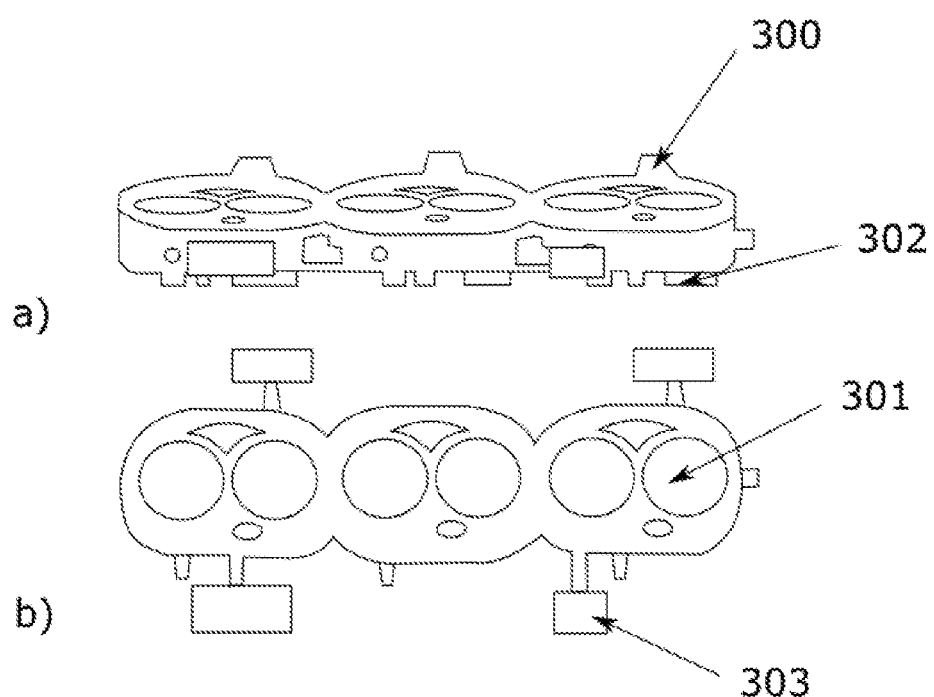
FIG. 3: Simplified view of a water jacket core for the production of automotive cylinder heads.
Figure 4:
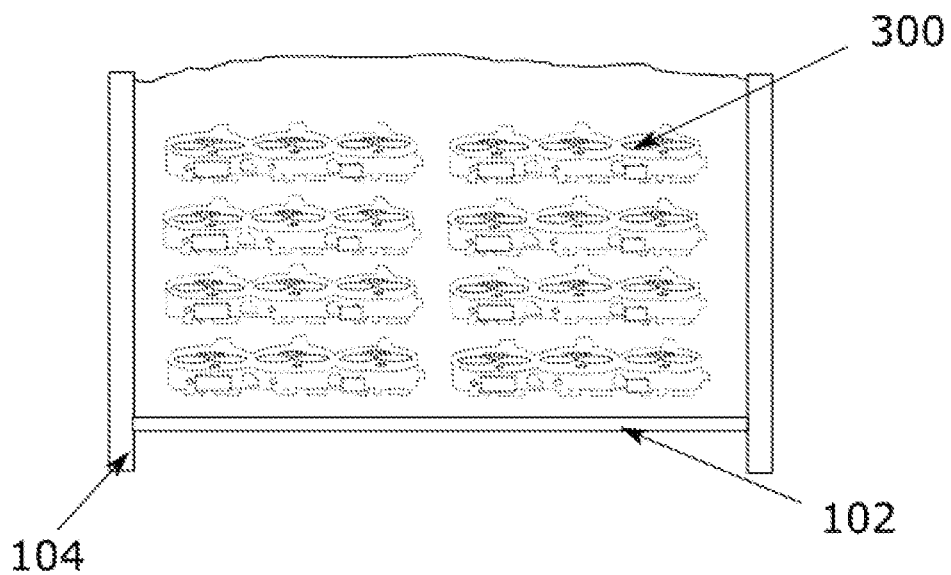
FIG. 4: View of water jacket cores produced by a conventional 3D printer in a conventional construction container.
Figure 5:
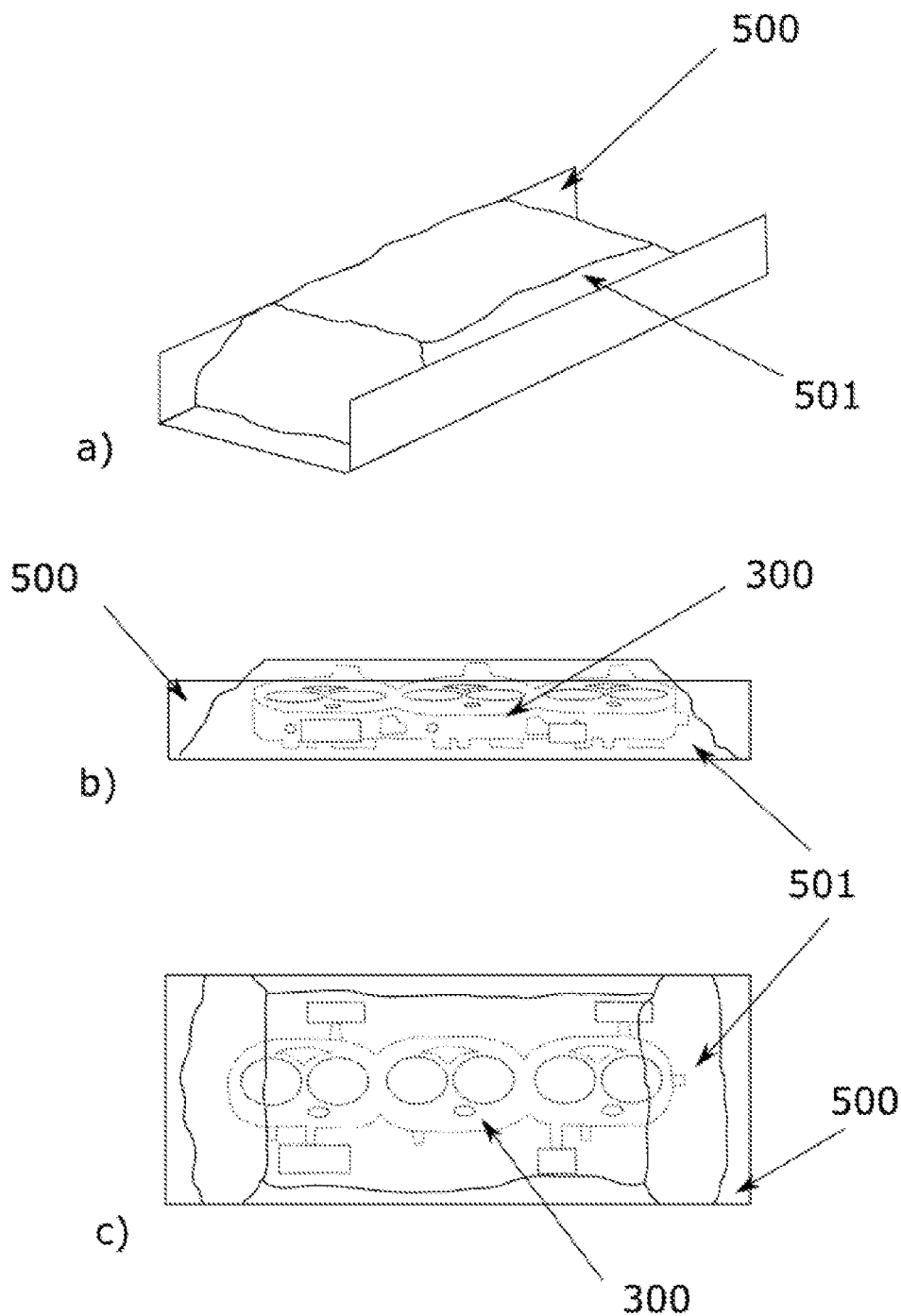
FIG. 5: View of a construction field tool according to the invention.
Figure 6:
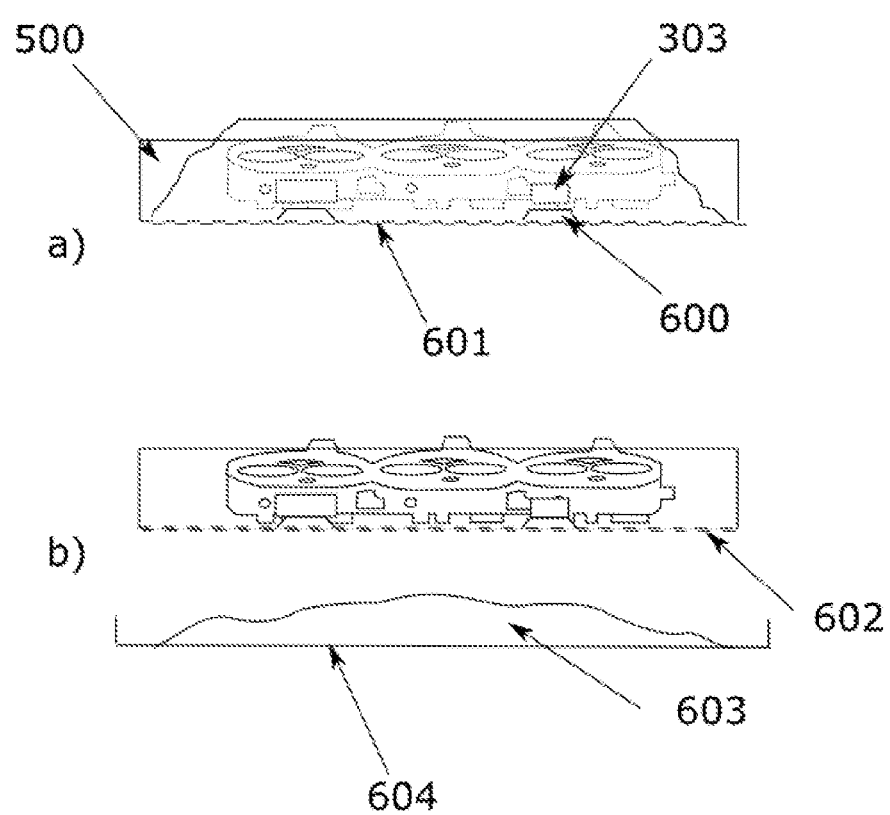
FIG. 6: View of a construction field tool with marks and a slider bottom.

After a coating process, the layer is imprinted with a liquid by means of an inkjet print head (100) (FIG. 1 (105), FIG. 2(b)). The print image corresponds to the section through the part at the current construction height of the device. The drops of the liquid (109) impinge on the particulate material and the liquid slowly diffuses into the powder.

After the printing of the binder, the layer is solidified according to the method of the invention (FIG. 2(c)). For this purpose, for example, an IR radiator (500) may be passed over the construction field. The radiator may be coupled with the axis of the coating system. During heating, the solvent evaporates. In the case of flammable liquids, the evaporating material is aspirated immediately.

Figure 7:
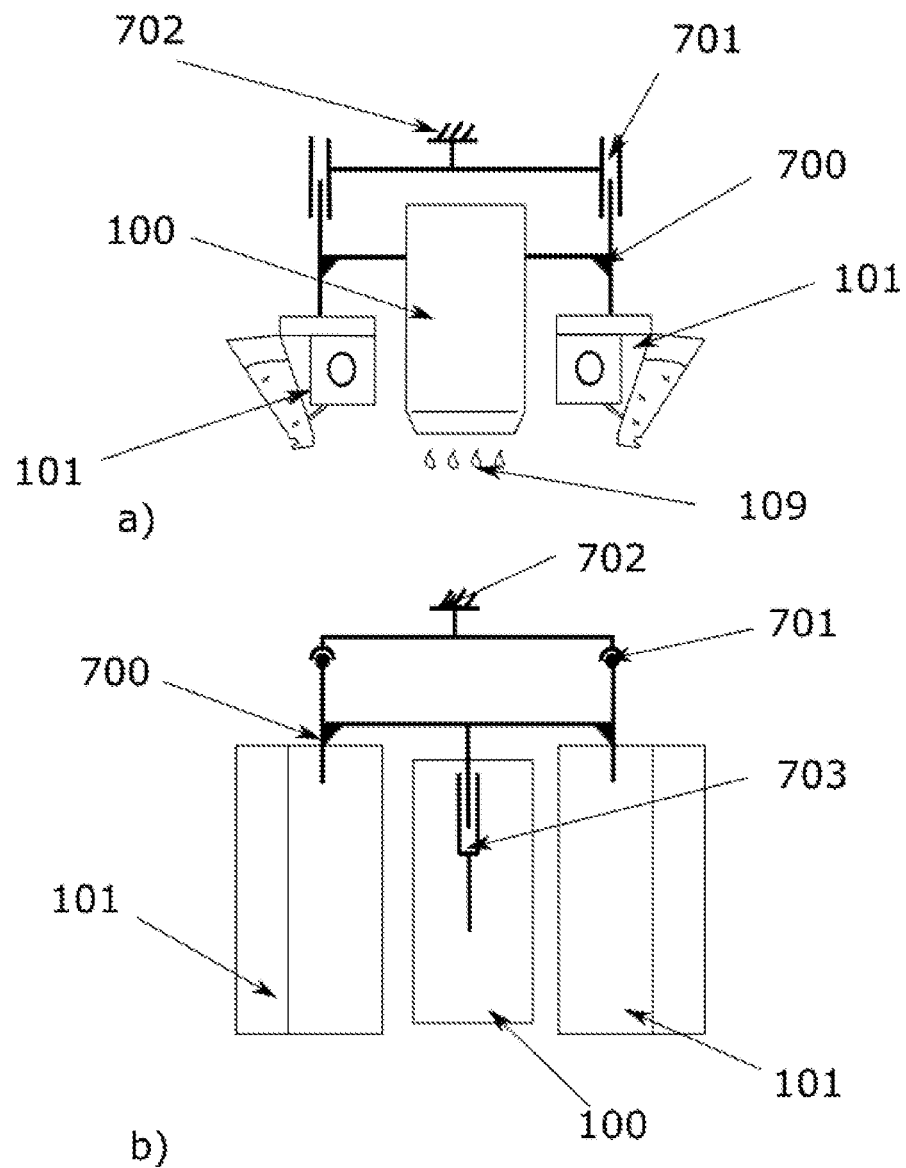
FIG. 7: View of the functional interconnections of a layering unit.
Figure 8:
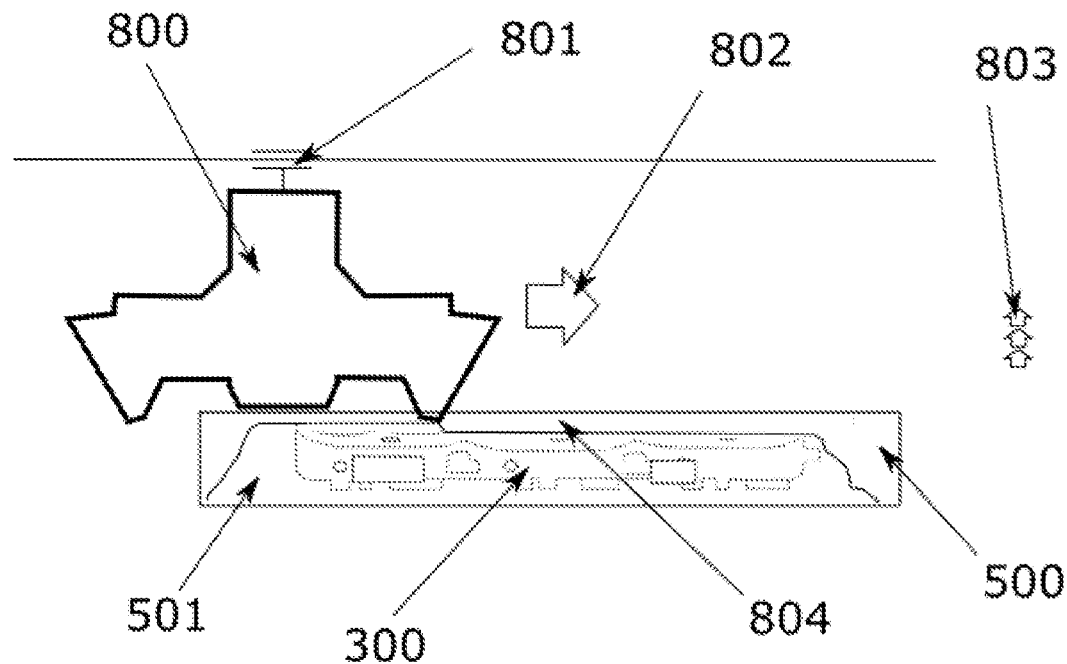
FIG. 8: View of the production of a layer using the construction field tool.

The layering units according to the invention (FIG. 7), when moved on a traversing axis (1000), are capable of forming layers of powder, imprinting them and changing their height relative to the traversing axis (1000). Thus, they practically work as independent modular printers.

The traversing axis (1000) moves the layering units relative to each other and to the ends of the traversing axis (1000). Arranged below the traversing axis (1000) are the so-called construction field tools (500). The latter are filled with powder and, thus, also with the desired parts by means of the layering units.

In contrast to the job boxes (104) common in the prior art, the construction field tools (500) are embodied such that their design takes subsequent steps after 3D printing into consideration. Their dimensions correspond to the part to be produced. Preferably, the volume of the container corresponds to no more than 50% of the box volume of a part to be produced. Particularly preferably, it is less than 30% of the part. It is preferably designed to be thermally stable. The bottom (601, 602) may be opened, for example, to discharge powder (603). There are marks affixed for detection by robot systems.

All elements are assembled into a 3D production plant. The latter comprises different stations which represent different production steps; there is at least one station for the actual printing (1301). In addition, there preferably are stations for heating (1400), a pre-unpacking station (1401) and a stripping station (1402) for the transfer of parts in subsequent production. The stations are interlinked via a chain of construction field tools which are fed to the individual stations in a synchronized manner. This feeding may be driven by a mechanical chain (1300) or other types of drive (belts, racks, wheels, linear motors).

Thus, the production device ranges from powder and liquid binder to the transfer of finished parts to a production interface.

Exemplary Embodiment

One exemplary application of the invention is the mass production of foundry cores in engine manufacture. In this context, the cores for the so-called water jackets (300) in the cylinder head, in particular, are very complex. These are often penetrated or framed by further cores for the inlet branch pipes and by the oil chamber.

In conventional series production, these cores (300) are produced using complex tools in core shooting plants. Each individual core must be free from undercuts. The tool for the complex shapes is extremely expensive. It consists of several sliders which are fed from different spatial directions and thereby define the cavity which is filled with the molding material in a further step.

The 3D printing of such cores or core packages is extremely attractive. It offers the opportunity to reduce mounting operations of the cores, to further increase their complexity and to quickly implement further developments in the mold.

A characteristic of such a core package is a specific geometric extension. For a four-cylinder engine, it may be, for example, 8×15×60 cm. This "form factor" remains constant over years of production, even if the geometric structure changes.

Applying the inventive idea to this example, the device represents a 3D printer whose construction volume is slightly larger than 8×15×60 cm. This volume can be processed quickly. Likewise, several of these volumes may be processed simultaneously or sequentially in one single device. The volume is defined by a special support, the construction field tool (500), which may be of extremely simple design as compared to a printing device with a normal construction space. In the case of the water jacket core, the construction field tool may constitute a sort of gutter. The print head (100) and the coater (101) as the layering unit pass through said gutter and produce the desired part.

The construction field tool (500) is very small and is adapted to the volume of the part. In this way, the size of the device, in particular the level of investment, is optimally adapted to the task. The construction field tool is particularly simple and is thus easy to integrate into a production line. This also allows easy integration during the assembly of such a production device by several companies.

The layering unit (FIG. 7, 800) is an essential basic unit of the device to be used in the method according to the invention. These units constitute closed modules. Each of said modules is present once or several times.

A layering unit consists of the print head (100), a print head offset device (703), preferably two coaters (101) and one axis (701) for height adjustment of the layering unit relative to its attachment point. The coaters (101) are preferably arranged laterally, e.g. to the right and left of the print head (100). If control makes it necessary, the coaters (101) may be arranged at different respective heights above the layer.

The coaters (101) of the layering unit (800) are, for example, approx. 220 mm wide and thus cover the part's dimensions (300). With a printing width of 180 mm, the print head (100) is also wider than the required part.

The print head may be shifted around the center line of the part, by 10 mm, respectively, in the example. This prevents a defective nozzle producing a defect in the part which would extend through the entire part (300) and make it unusable.

The offset mechanism (703) must offset the print head (100) so precisely that the print image is applied within an acceptable tolerance from one layer to the next. In this context, +−10 µm is an acceptable range of accuracy.

The print head (100) is arranged somewhat higher up than the coaters (101) to prevent it from contacting the powder. A technically sound distance would be approximately 2.5 mm.

In order to allow execution of the exemplary task of producing foundry cores, a 300 DPI print head (100) is used. The distance of the nozzles arranged in the direction of the offset axis is then 84.6 µm.

The height of the layering unit (800) above the attachment point (702) may be adjusted, as described, via an axis (701), which is part of the layering unit. Since very thin layers are required, good resolution and reproducibility are needed here. In the example of the water jacket, the layering unit must have a travel of approx. 100 mm. Accuracy should exceed +−10 µm.

The usual layer thicknesses for the exemplary task are approximately 300 µm. Further common layer thicknesses are 400 µm when a higher throughput is required, and 250 µm when higher accuracy is required.

The layering units (800) are arranged on an axis (1000). The attachment point (801) is the carriage of this axis. With the help of this axis, the layering unit can be moved into the spatial direction perpendicular to the offset axis (703) and vertical axis (701), respectively.

Said axis (1000) is the longest axis in the device. It has a travel of several meters. In the example, the layering unit (800) can be moved over a length of 4 meters. The traversing axis (1000) is technically designed such that it can carry several layering units, which then move behind each other in a side view.

One possible technical embodiment of this axis (1000) is a ball guide combined with a linear motor on the carriage. In a simple manner, this arrangement allows several carriages to be used for several layering units. Each carriage has its own energy chain leading to it to supply the layering unit (800) with data, energy and fluid. The coaters (101) are supplied with powder via static filling mechanisms.

The layering units (800) may apply the powder (110) and the printing liquid (109) onto any desired, not necessarily level surfaces. In this case, the coaters (101) generate a planar surface with their lower edges, when powder flows out and the layering unit (800) is moved at the same time.

According to the invention, a special construction field tool (500) is used as the surface. This construction field tool may be of particularly simple design according to the invention. It includes no elements defining the precision of the parts.

In the example, a gutter-like arrangement is used as the construction field tool (500). The opening of the gutter may be traversed by a layering unit (800). The walls prevent the powder from spreading perpendicular to the working direction of the layering unit. In the bottom layer of the layering unit, no element of the construction field tool is touched.

The construction field tool may be provided with a bottom (601) allowing the loose powder (603) around the part to be discharged. In this case, the part descends and is received by marks (600) affixed to the construction field tool. A defined position is thus reached. The marks on the part (303) must be designed such that no adhesions interfere with the exact positioning on the construction field tool (500). If processes with strong adhesions are performed, further means such as compressed air nozzles must be used in the area of the marks (303, 600).

In order to ensure sufficient flexibility of the device, intermediate parts may be printed as well. These intermediate parts guarantee the position of the parts (300) relative to the construction field tool (500) without the desired part, which is a water jacket core (300) in this example, having to exhibit features of the device.

The layering units (800) according to the invention allow the process to be performed in a flexible manner. For example, several layering units (800) may be used on the traversing axis (1000) in parallel and independently of each other. It is also possible to design the traversing axis (1000) to have such a length that the layering units can pass over several construction field tools. Devices are also preferred in which several construction field tools (500) and several layering units (800) can be used in a line.

This arrangement may be utilized to accelerate the process. In this case, two layers (107) are applied simultaneously during each feed movement. During the return movement of the units (800), two layers (107) may also be applied at the same time. For this purpose, the layering units (800) are placed in the correct spatial position by their vertical axes (701). To this end, the first layering unit in the direction of travel is one layer lower than the subsequent unit. During the return pass, this arrangement is reversed.

Figure 9:
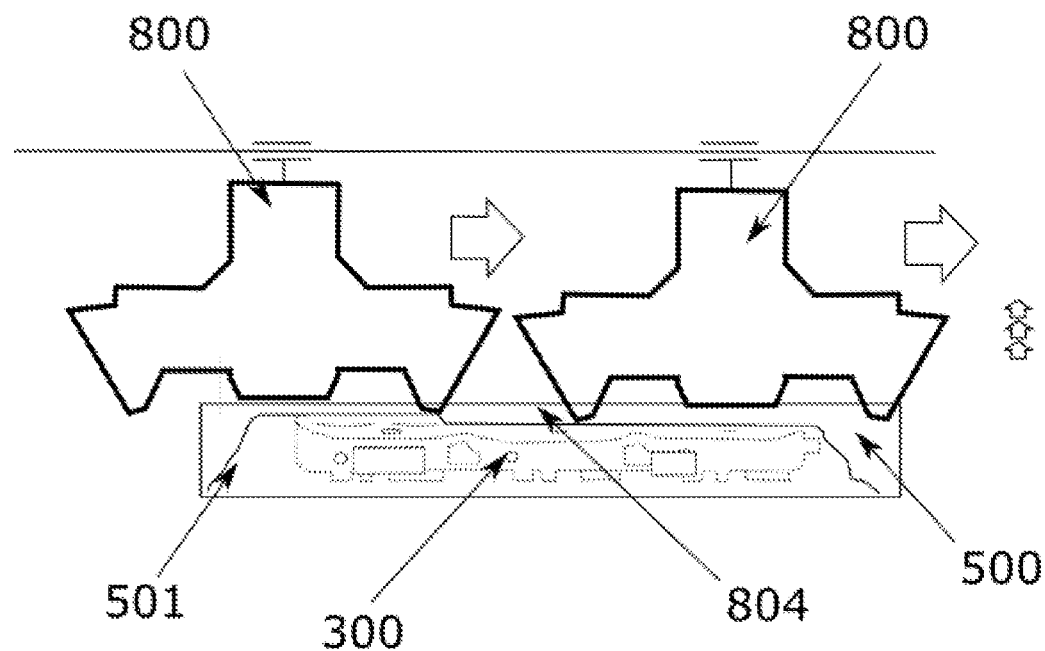
FIG. 9: View of the synchronous production of two layers using two layering units.
Figure 10:
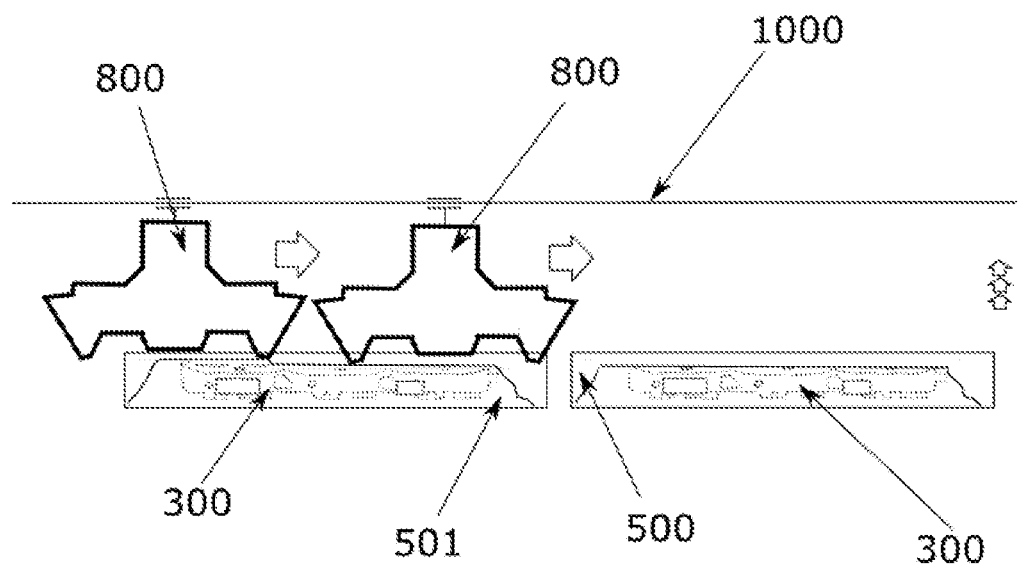
FIG. 10: View of an extended working chamber comprising two construction field tools.
Figure 11:
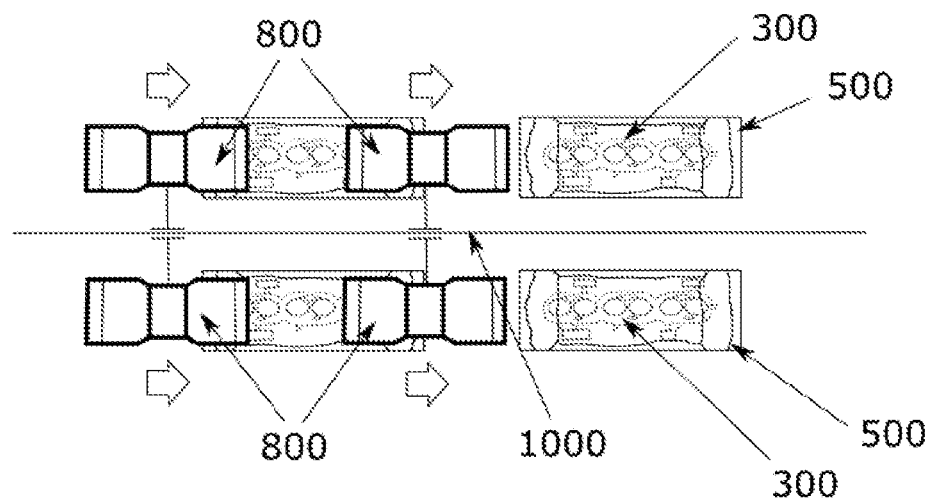
FIG. 11: View of a device with enhanced performance.
Figure 12:
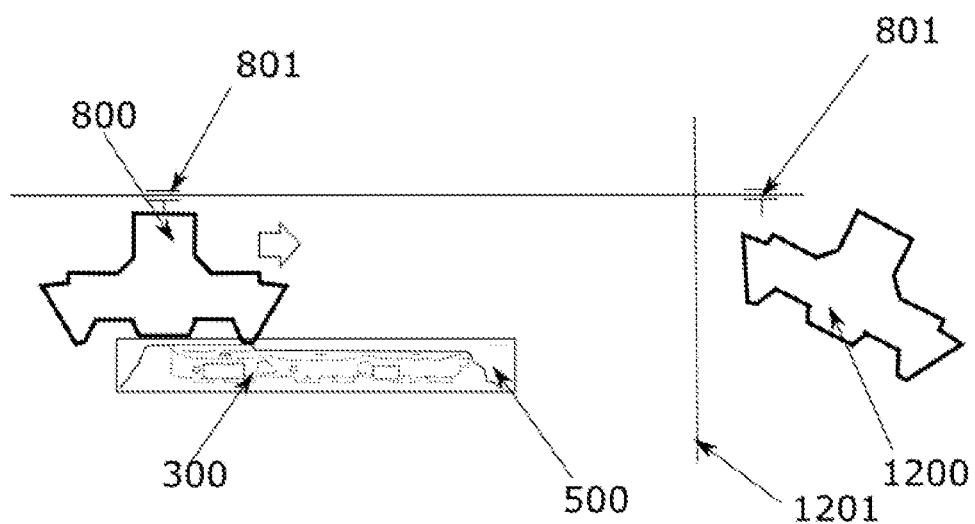
FIG. 12: View of the replacement of a layering unit during the ongoing process.
Figure 13:
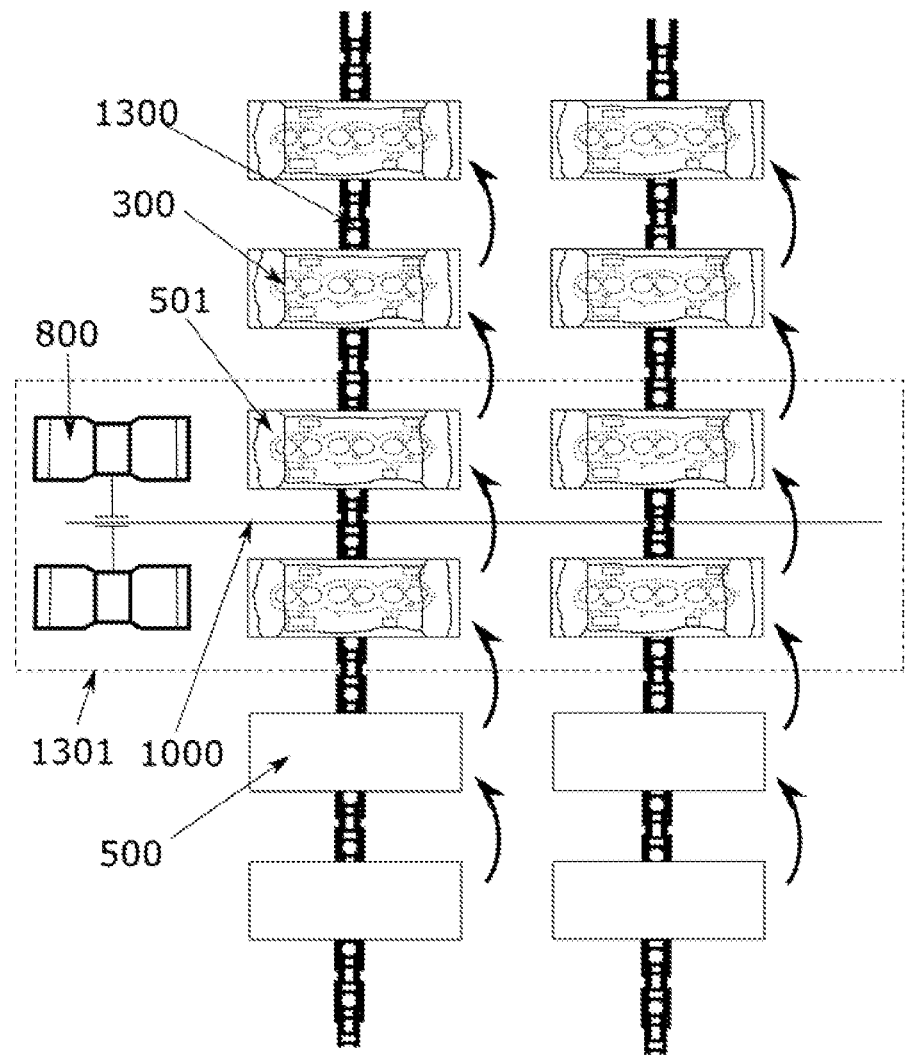
FIG. 13: View of a potential production facility with construction field tools which can be moved in a synchronized manner by a chain.
Figure 14:
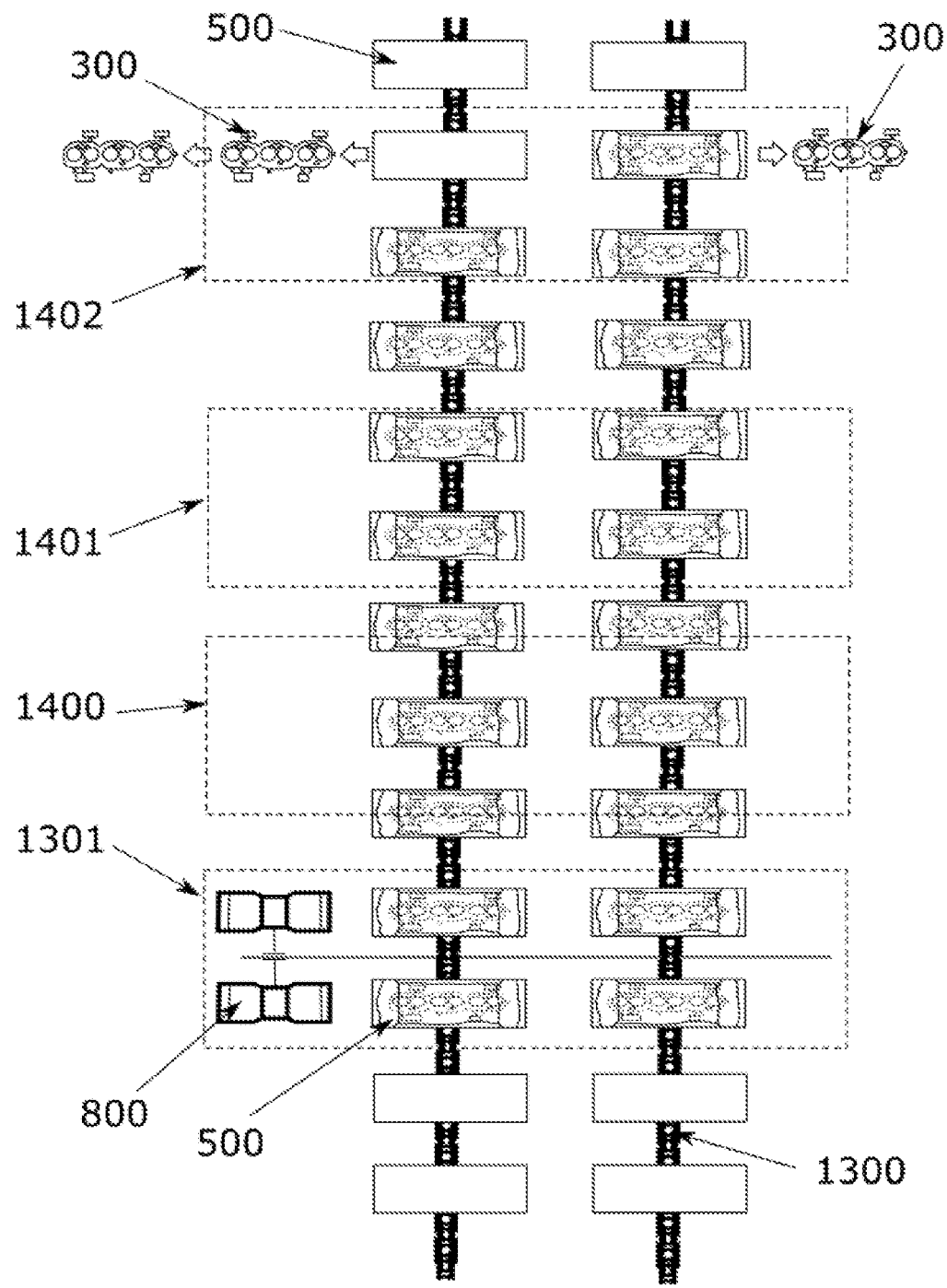
FIG. 14: View of a potential production facility with different process stations from the powder to the final part.

A further increase in the performance of the arrangement may be achieved by mirroring the layering units via the traversing axis (1000). This will double the potential performance when at the same time making multiple use of existing device parts (see FIG. 9).

An arrangement comprising several layering units (800) may also be used to perform maintenance work (1200) on a unit while the process is still ongoing. For this purpose, one unit is moved to the edge position. A separating protecting device (1201) provides protection against interference with the system. Now, the unit (1200) can be dismantled manually or semi-automatically. A corresponding design will allow a fast change of the entire layering unit (1200). The presented unit is mounted and connected to the system again. Due to the height adjustment (701), the layering unit (800) may also be returned into the process during processing of a construction field tool.

Due to the redundancy of the layering units (800), the device according to the invention enables reliable and high-performance operation of the system.

The construction field tools (500) may preferably be embodied such that after each completion of a part, a new construction field tool (500) can be moved into the work area of the layering units (800) in a synchronized manner. Such movement of the construction field units may be achieved by an arrangement comprising a chain (1300). The construction field units themselves run on rails. Really exact positioning is not necessary. It is merely required to ensure the free passage of a layering unit (800) through the construction field tools (500) used in this exemplary embodiment. The construction field tools (500) may be connected to the moving system by further plates. This will also enable the quick use of other construction field tools (500).

The space in which the actual printing process takes place may be accommodated in a housing (1301). In said housing (1301), the atmosphere is easy to control in order to keep the printing process stable. Also, any dust coming from the process chamber (1301) cannot affect the surroundings. Automatically operated flaps and gates enable access to the respective construction field tools (500). Also, there are access flaps (1201) for the layering units (800), which allow the layering units (800) to be moved to the maintenance position.

The construction field units may be conveyed to further positions via the drive, which is a chain (1300) in the example. This makes a production line easy to build. Such a position could be an oven (1400) for further hardening of the parts. In the example, cores are to be produced using an inorganic binder system. The after-treatment takes place at approximately 200° C. For this purpose, the oven (1400), just like the space for the printing process (1301), is equipped with automatic gates. Again, the idea underlying the invention is decisive here. Due to the construction field tool (500) being adapted to the part (300), the volume to be heated is reduced to the necessary minimum. This allows quick heating, so that the device can be held briefly.

Another station of this production line is automatic pre-unpacking (1401). In this case, a construction field tool (500) is used which has a bottom (601) that can be opened (602) for powder. The loose powder (603) will thus trickle away from the part. This process may be additionally supported by a vibration device. This causes the part (300) to descend onto the above-described marks (600). Small air nozzles clean the contact surfaces in this area. Some of the contacts are provided as spheres, some as straight surfaces. In a reproducible manner, this results in a defined position.

The powder (603) flowing down from the part (300) is collected below the device (604). It may be fed to a powder recycling device by screw conveyors or conveyor belts.

The pre-unpacking station (1401) is preferably also provided with a housing. This serves, in particular, to keep out dust from the ambient air. Again, there are also automatic gates.

The actual unpacking station/stripping station (1402) is a robot cell. A robot arm uses a compressed air jet to clean those areas where the part (300) is to be subsequently gripped. A second robot arm grips the part (300) here using a compressed air gripper. The second robot moves the part (300) past the compressed air nozzle of the first robot and thereby cleans the part completely of any adhesions. The cleaning effect results from the similarity of the parts, controlled by a teach-in, without using the exact geometric data of the part (300). Upon completion of the finishing operation, the robot transfers the finished part to another system for commissioning in the foundry.

The following features apply analogously for a method and a device according to the invention and may be implemented individually or in any combination:
- the device comprises several layering units;
- the device comprises vertically movable layering units;
- the device comprises separately vertically movable layering units;
- the device comprises symmetrically mirrored layering units;
- the device comprises a stationary frame, through which a conveyor for construction field tools passes;
- the device provides stationary construction field tools in a synchronized manner;
- the device includes two or more construction field tools running parallel in the printing direction can be printed on in parallel;
- the device uses construction field tools that extend in the printing direction and which can receive one or more products along this direction;
- the device includes several construction field tools arranged behind one another in the printing direction can be used;
- the device has a long travel in relation to the printing width;
- the device has a central linear axis designed to receive layering units;
- the device has maintenance areas for the layering units that can be separated for safety;
- the device has powder refill devices that are adjustable to the height of the layering units;
- the device includes print head cleaning stations;
- the device includes a housing that can be opened in a synchronized manner to safeguard the process atmosphere;
- the device includes a conveyor for construction field tools;
- the device includes a continuous conveyor for construction field tools;

the device includes a chain drive for the synchronized movement of construction field tools;
the device includes a toothed belt drive for the synchronized movement of construction field tools;
the device includes a flat belt, V-belt or round belt drive for the synchronized movement of construction field tools;
the device includes an after-treatment unit for the after-treatment of printed products;
the device includes an oven for the after-treatment of printed products;
the device includes a vacuum chamber for the after-treatment of printed products;
the device has a closable chamber for further hardening of printed products by introduction of reactive gases;
the device includes a station for automatic pre-unpacking of parts;
the device uses construction field tools which allow the discharge of loose powder;
the device includes a conveyor for conveying loose powder away; or
the device includes integrated robots for receiving, cleaning and passing on printed products.

LIST OF REFERENCE NUMERALS

100 print head
101 coater
102 construction platform
103 part
104 construction container/job box
105 print head path
106 coater path
107 layers
108 path of the construction platform
109 drop of binding agent
110 powder for filling the layers
111 construction field
112 gap in the coater for powder discharge
113 powder reserve in the coater
200 IR radiation source
300 water jacket core
301 valve opening
302 channel to the engine block
303 overhanging core mark
500 construction field tool
501 powder cake
600 construction field tool marks
601 tool bottom closed
602 tool bottom open
603 run down powder
604 powder collection system/conveyor
700 layering unit frame
701 vertical axis
702 attachment point
703 offset axis
800 layering unit
801 attachment to the traversing axis
802 movement direction
803 layer feed
804 layer to be processed
1000 traversing axis
1200 layering unit for maintenance
1201 protecting device
1300 chain
1301 enclosure for printing unit
1400 oven station
1401 pre-unpacking station
1402 stripping station

What is claimed is:

1. A device for manufacturing 3D molded parts, characterized in that it comprises one or more construction field tools for manufacturing 3D molded parts, arranged in a movable manner, and at least one layering unit including a print head and a coater, also arranged in a movable manner, wherein each of the one or more construction field tools includes a bottom having an open position and a closed position, wherein the bottom is closed for moving the construction field tool with a part and loose powder from a work area for constructing the part to a next work position, and the bottom opens when the construction field tool is at a pre-unpacking station for discharging a loose powder around the part;
wherein the bottom of each one of the construction field tools is opened by a horizontal slider or a flap;
wherein a vertical position of the bottom of the construction field tool is stationary, at all times, with respect to side walls of the construction field tool.

2. The device according to claim 1, characterized in that the at least one layering unit are movable in the direction of Z or/and X.

3. The device of claim 1, wherein the one or more construction field tools are movable in the direction of X or/and Y.

4. The device of claim 1, wherein the one or more construction field tools includes a plurality of construction field tools arranged in series and connected to each other.

5. The device of claim 1, wherein each of the at least one layering unit includes a vertical axis that moves the coater and print head in a vertical direction.

6. The device of claim 1, wherein the one or more construction field tools substantially have the dimensions of the 3D molded part to be manufactured.

7. The device of claim 1, wherein the one or more construction field tools includes a plurality of construction field tools connected to each other by one or more chains, one or more toothed belts, one or more racks, or one or more cables, and the plurality of construction field tools are thereby movable or/and can thereby be synchronized.

8. The device of claim 1, wherein the device is configured to work in a synchronized manner.

9. The device of claim 1, wherein the device comprises means for process steps after construction of the 3D molded parts or/and the device comprises means for automated removal of the 3D molded parts.

10. The device of claim 1, wherein the one or more construction field tools includes a plurality of construction field tools arranged in series and connected to each other;
the one or more construction field tools and the at least one layering unit are controllable in a directed, coordinated manner.

11. The device of claim 10, wherein the one or more construction field tools substantially have the dimensions of the 3D molded part to be manufactured.

12. The device of claim 11, wherein
the one or more construction field tools are movable in the X and/or Y directions; and
the at least one layering unit are movable in the X and/or Z directions.

13. The device of claim 10, wherein the plurality of construction field tools are connected to each other and move in a synchronized manner.

14. The device of claim 1, wherein the at least one layering unit includes a layering unit that is a single module and includes a printhead connected to and arranged between two coaters, wherein the printhead and two coaters connected together and travel together on a traversing axis.

15. The device of claim 1, wherein the device includes parallel construction field tools including a first construction field tool and a second construction field tool, wherein the at least one layering unit includes a layering unit that is a single module that coats and selectively prints on the first construction field tool and then coats and selectively prints on the second construction field tool in a single pass along a traversing axis.

16. The device of claim 1, wherein the at least one layering unit includes a first layering unit that is a single module and the construction field tools includes a first construction field tool, wherein the first layering unit traverses over the first construction field tool while the construction field tool is at a work position, wherein the first layering unit includes a coater and a printhead.

17. The device of claim 1, wherein the construction field tool has the horizontal slider.

18. The device of claim 17, wherein a partial movement of the horizontal slider in a length direction creates openings along the length direction of the construction field tool.

19. A method for manufacturing 3D molded parts comprising a step of:
 moving a construction field tool into a work area having one or more layering units, wherein the construction filed tool has a set of opposing side walls, wherein one or both of the other sides has no side walls or has side walls having a lower height than the set of opposing side walls;
 producing each of the 3D molded parts in a separate construction field tool by means of the one or more layering units, wherein the one or more layering units moves between the set of opposing side walls and becomes at least partially interposed between the set of opposing side walls, wherein the 3D molded part is surrounded by loose powder material; and
 moving the construction field tool to a pre-unpacking station.

20. The method of claim 19, wherein the layering unit includes a print head, a coater, and vertical axis that moves the print head and coater in a vertical direction.

21. The method of claim 19, wherein the construction field tool is connected to one or more additional construction field tools, wherein the construction field tools move in a first horizontal direction.

22. The method of claim 21, wherein the one or more layering units move over a construction field tool in a second horizontal direction orthogonal to the first horizontal direction.

23. The method of claim 21, wherein the opposing side walls have a face surface that is perpendicular to the first horizontal direction.

24. A device for manufacturing 3D molded parts comprising: a multiple of construction field tools for manufacturing 3D molded parts, arranged in a movable manner in a movement direction, and
 at least one layering unit including a print head and a coater, also arranged in a movable manner in a working direction perpendicular to a vertical direction and the movement direction,
 wherein each of the one or more construction field tools, prior to manufacturing the 3D molded part, has a bottom, left side wall and right side wall each connected to the bottom to prevent powder from spreading perpendicular to the working direction, and one or both of the other sides has no side walls or side walls having very low height to allow easy removal of the 3D part, wherein the left side wall has a face that is perpendicular to the movement direction and a height of the at least one layering unit is arranged for moving in the working direction at least partially interposed between the left and right side walls.

25. The device of claim 24, wherein the at least one layering units includes a first layering unit and a redundant layering unit; wherein the printing speed is increased by using the multiple layering units and replacement or maintenance work of the first layering unit can be performed outside a housing while the device is manufacturing a part in the housing with the redundant layering unit;
 optionally, wherein the print head of each layering unit is between the coater and a second coater and the layering unit prints in both a forward and a return direction;
 optionally wherein the device includes a print head cleaning station in the housing.

26. A device for manufacturing 3D molded parts comprising:
 at least one or more construction field tools, arranged in a movable manner, and at least one layering unit, also arranged in a movable manner,
 wherein each of the one or more construction field tools includes at least two walls and a bottom having an open position and a closed position,
 wherein the bottom is closed for moving the construction field tool with a part and loose powder from a work area for constructing the part to a next work position, and the bottom opens when the construction field tool is at a pre-unpacking station for discharging a loose powder around the part;
 wherein each of the one or more construction field tools has marks for receiving the part when the loose powder is discharged so that the part is spaced above the bottom of the construction field tool.

27. A device for manufacturing 3D molded parts comprising:
 one or more construction field tools for manufacturing 3D molded parts, arranged in a movable manner, and
 at least one layering unit including a print head and a coater, also arranged in a movable manner,
 wherein each of the one or more construction field tools includes an integrated bottom having an open position and a closed position, wherein the bottom is closed for moving the construction field tool with a part and loose powder from a work area for constructing the part to a next work position, and the bottom opens when the construction field tool is at a pre-unpacking station for discharging a loose powder around the part;
 wherein the bottom is opened and closed by a horizontal slider, a flap, or other component integral to the construction field tool; wherein a vertical position of the bottom is stationary, at all times, with respect to side walls of the construction field tool and two opposing sides of the construction field tool are free of side walls.

* * * * *